United States Patent [19]
Uemura et al.

[11] Patent Number: 6,046,770
[45] Date of Patent: *Apr. 4, 2000

[54] IMAGING APPARATUS

[75] Inventors: Kazunori Uemura; Takashi Takahashi, both of Hitachinaka, Japan

[73] Assignees: Hitachi, Ltd.; Hitachi Microcomputer Systems Ltd., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/814,641

[22] Filed: Mar. 10, 1997

[30] Foreign Application Priority Data

Mar. 11, 1996 [JP] Japan ................ P08-053158

[51] Int. Cl.[7] .................... H04N 5/262; G03B 17/00
[52] U.S. Cl. ............................ 348/240; 348/358
[58] Field of Search .................... 348/240, 358; 359/696, 698; H04N 5/232

[56] References Cited

U.S. PATENT DOCUMENTS

| | | | |
|---|---|---|---|
| 5,420,632 | 5/1995 | Yamagiawa | 348/240 |
| 5,600,496 | 2/1997 | Mori | 359/820 |
| 5,754,275 | 5/1998 | Takeda | 355/30 |

FOREIGN PATENT DOCUMENTS

| | | |
|---|---|---|
| 0 579 165 A1 | 1/1994 | European Pat. Off. . |
| 0 608 099 A1 | 7/1994 | European Pat. Off. . |
| 4-253014 | 8/1992 | Japan . |
| 6-165015 | 6/1994 | Japan . |
| 6-350891 | 12/1994 | Japan . |
| 7-107362 | 4/1995 | Japan . |

*Primary Examiner*—Wendy Garber
*Assistant Examiner*—Luong Nguyen
*Attorney, Agent, or Firm*—Antonelli, Terry, Stout & Kraus, LLP

[57] ABSTRACT

Smooth interlocking operation of an optical zooming device and an electronic zooming device are realized by storing an amount of mechanical play of the optical zooming device in a play memory and then calculating the amount of mechanical play of the optical zooming from both the stored amount of mechanical play and lens drive control information to change the interlocking operation starting point of the optical zooming device and the electronic zooming device.

20 Claims, 6 Drawing Sheets

DURING FORWARD OPERATION

IMMEDIATELY AFTER INVERSE ROTATION

UPON DRIVE OF 20 STEPS AFTER INVERSE ROTATION

OPERATION FOR 0 RESET

WHEN THE ZOOM LENS MOVES IN 10 STEPS IN THE ANGLE DIRECTION

WHEN THE ZOOM LENS MOVES IN 10 STEPS IN THE TELEPHOTO DIRECTION

WHEN THE ZOOM LENS MOVES IN 30 STEPS IN THE WIDE TELEPHOTO SIDE

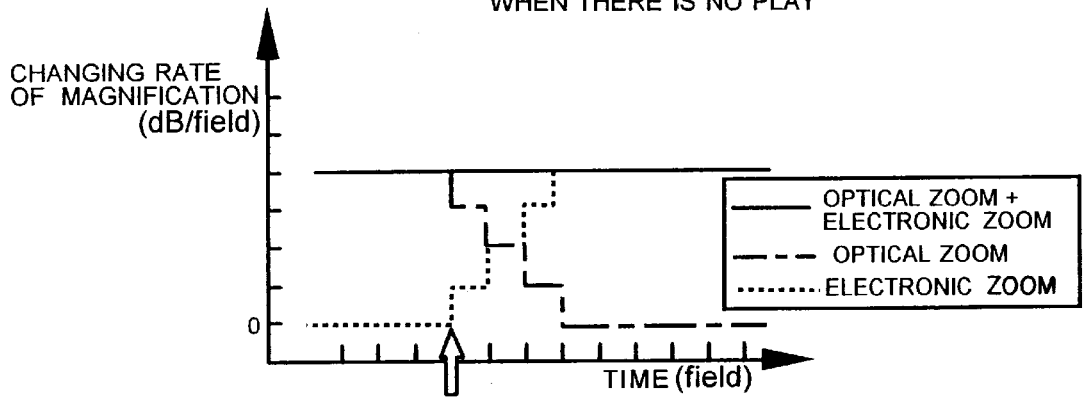
FIG. 4(a) WHEN THERE IS NO PLAY
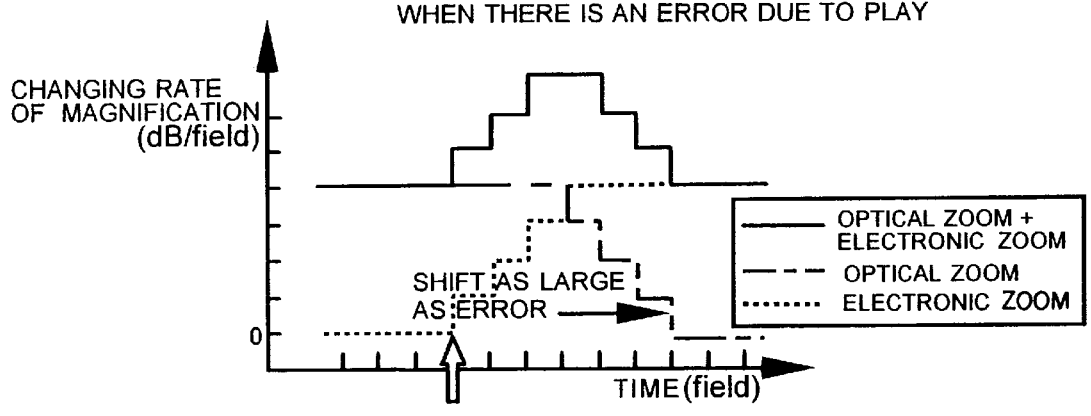
FIG. 4(b) WHEN THERE IS AN ERROR DUE TO PLAY
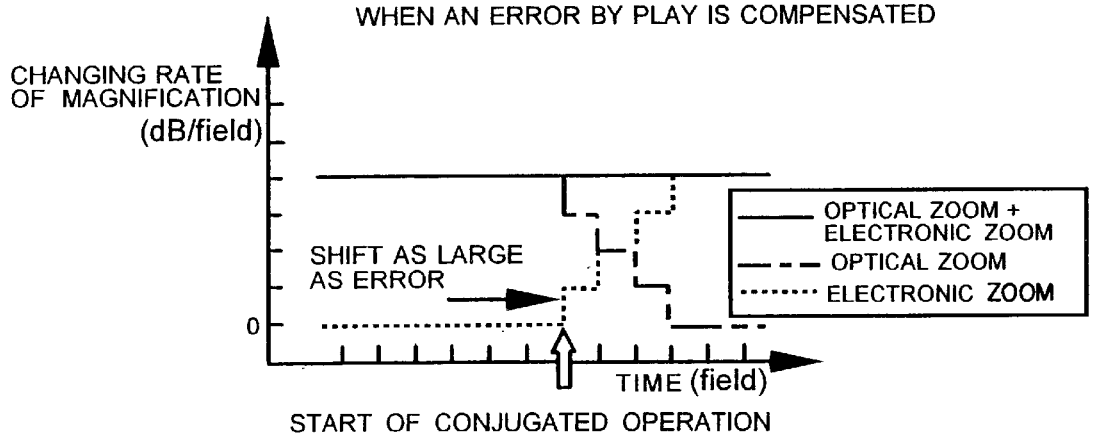
FIG. 4(c) WHEN AN ERROR BY PLAY IS COMPENSATED

WHEN THERE IS NO PLAY

WHEN PLAY IS COMPENSATED

IMAGING APPARATUS

BACKGROUND OF THE INVENTION

The present invention relates to an imaging apparatus, and particularly to an imaging apparatus including both an optical zooming function and an electronic zooming function.

A zoom lens drive mechanism utilizing a stepping motor is already popular as a typical means for moving an optical zoom lens along an optical axis to effect zooming. In such a zoom lens drive mechanism, the zoom lens position is detected by forming an open loop with an optical zooming means, an optical zooming control means and a stepping motor and by continuously monitoring the number of driving steps of the stepping motor with the optical zooming control means in order to equivalently monitor the zoom lens position of the optical zooming means.

Moreover, in Japanese Patent Application Laid-Open No. HEI6-273658, it is indicated that an optical zooming means and an electronic zooming means can be smoothly interlocked for operation, on the occasion of transition to electronic zooming from optical zooming or transition to optical zooming from electronic zooming, by varying the magnifying power changing rate of the electronic zooming means and providing a parallel operating section, where the optical zooming means and electronic zooming means operate in parallel within a video camera in which there is provided both an optical zooming means and an electronic zooming means for purposes of extending the zooming range. In addition, it is also described in the same publication that the optical zooming means and electronic zooming means can be interlocked smoothly by changing the parallel operating sections for each zooming rate.

When a zoom lens is to be driven with a stepping motor via gears or the like, a mechanical play is inherently present at the engaging portions, etc. of the gears. In this case, when the amount of play is zero, the zoom lens position can be equivalently determined by monitoring the number of the drive steps of the stepping motor with an optical zooming control means.

However, if the amount of play increases, the error generated at the zooming position indicated by the optical zooming control means also increases. Moreover, when the driving direction is reversed, the lens drive first must be operated to take up the amount of play. The amount of play also fluctuates depending on the manufacturing process. Here, there is a problem in that, even if optical zooming control means are designed to the same specifications, the amount of play is not always equal and it also changes depending on temperature. This mechanical play also results in deviation of the parallel operating section for the optical zooming means and electronic zooming means from the optimum position during the interlocking operation of such optical and electronic zooming means. Under this condition, the optical zooming means and electronic zooming means can no longer be interlocked for proper operation even with the technique described in the Japanese Patent Application Laid-Open No. Hei 6-273658.

SUMMARY OF THE INVENTION

Therefore, the object of the present invention is to solve the problems explained above, by taking these points into consideration. A smooth interlocking operation between the optical zooming means and electronic zooming means can be achieved by storing typical values of an amount of mechanical play of the optical zooming means into a memory, calculating the instantaneous amount of mechanical play of the optical zooming means from the stored amount of mechanical play and from lens driving control information, and then changing the starting point of the interlocking operation of the optical zooming means and the electronic zooming means in response to the calculation.

In order to attain this object of the present invention, the imaging apparatus of the present invention, which is designed to form an image format on the imaging surface of a solid state imaging device through a predetermined optical system and to output the image format after it has been converted to an image signal, is structured to comprise an optical zooming means for moving a zoom lens of the optical system along its optical axis to magnify or reduce the image of an object formed on the imaging surface, an optical zooming control means for controlling the optical zooming means with an open loop control, and electronic zooming means for magnifying or reducing an output image while changing the extraction size of the image format on the imaging surface, an electronic zooming control means for effecting control to continuously magnify or reduce an output image of the electronic zooming means, a memory means for storing a value corresponding to an amount of mechanical play of the optical zooming means, and a play calculating means for calculating an instantaneous amount of mechanical play of the optical zooming means based on the value of an amount of play stored in the memory means and a control result of the optical zooming control means, whereby the optical zooming means and the electronic zooming means are interlocked with each other to operate smoothly by changing, at the time of the starting of interlocking operation of the optical zooming means and the electronic zooming means, the starting point of the interlocking operation depending on the instantaneous amount of mechanical play of the optical zooming means calculated by the play calculating means.

Further, the imaging apparatus of the present invention having the construction described above is structured so that the electronic zooming means and said optical zooming means are interlocked with each other to smoothly operate by providing a period for previously canceling, with said optical zooming means, the mechanical play of said optical zooming means calculated by said play calculating means before starting the interlocking operation of said electronic zooming means and said optical zooming means.

Moreover, the present invention comprises a temperature detecting means for detecting temperature, whereby the play calculating means compensates for an amount of mechanical play of the optical zooming means depending on the detection result of the temperature detecting means.

Moreover, in accordance with the present invention, part of the structural elements need not be comprised within the imaging apparatus body; for example, an external control circuit or an external memory or the like may be used.

As explained above, the present invention realizes an imaging apparatus which assures smooth interlocking operation of the optical zooming means and electronic zooming means by providing a period for changing the interlocking operation starting point of the optical zooming means and electronic zooming means, or by previously canceling play in the parts by storing a value of mechanical play of the optical zooming means into a play memory and calculating the instantaneous mechanical play of the optical zooming means from the amount of such stored mechanical play and lens drive control information.

BRIEF DESCRIPTION OF THE DRAWINGS

The present invention will be more apparent from the following detailed description, when taken in conjunction with the accompanying drawings, in which:

FIGS. 4(a) to 4(c) are diagrams showing a change rate of magnification during transition to electronic zooming from optical zooming in accordance with the present invention.

DETAILED DESCRIPTION OF A PREFERRED EMBODIMENT

A preferred embodiment of the present invention will be explained with reference to the accompanying drawings.

Figure 1:
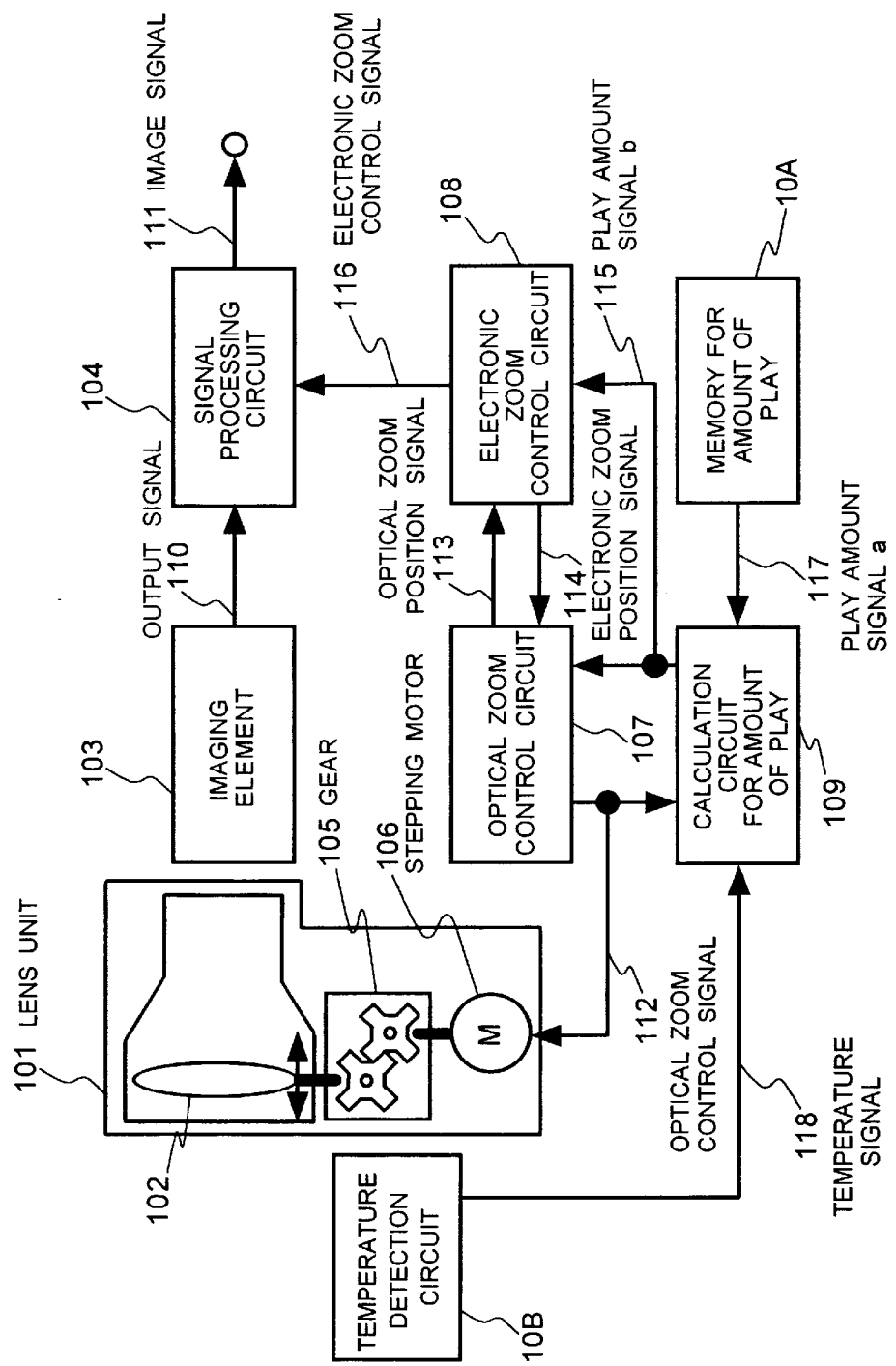
FIG. 1 is a block diagram showing a structure of an imaging apparatus forming a preferred embodiment of the present invention.

FIG. 1 is a block diagram of an imaging apparatus forming an embodiment of the present invention (hereinafter referred to as the present embodiment). In this figure, numeral 101 designates a lens unit; 102, a zoom lens; 103, a solid state imaging device (hereinafter referred to as an imaging device); 104, a signal processing circuit; 105, a zoom lens drive gear (hereinafter referred to as a gear); 106, a stepping motor for driving the zoom lens; 107, an optical zooming control circuit; 108, an electronic zooming control circuit; 109, a play calculating circuit; 10A, a play memory; 10B, a temperature detecting circuit.

The zoom lens 102 in this present embodiment can provide a zooming effect up to three times at a maximum and is driven via a gear 105 by driving the stepping motor 106 with an optical zooming control signal 112 provided from the optical zooming control circuit 107. In this case, the optical zooming control circuit 107 continuously monitors the optical zooming control signal 112 to determine in which step from the zero reset position the stepping motor 106 is located to detect the optical zooming position.

Moreover, the light image obtained via the zoom lens 102 is converted into an electrical signal by the imaging device 103 and is then inputted to the signal processing circuit 104. The signal processing circuit 104 magnifies or reduces the image format in response to the electronic zooming control signal 116 received from the electronic zooming control circuit 108 and outputs a video signal 111.

Next, the mechanical play in the drive of the optical zooming means will be explained.

Figure 2A:
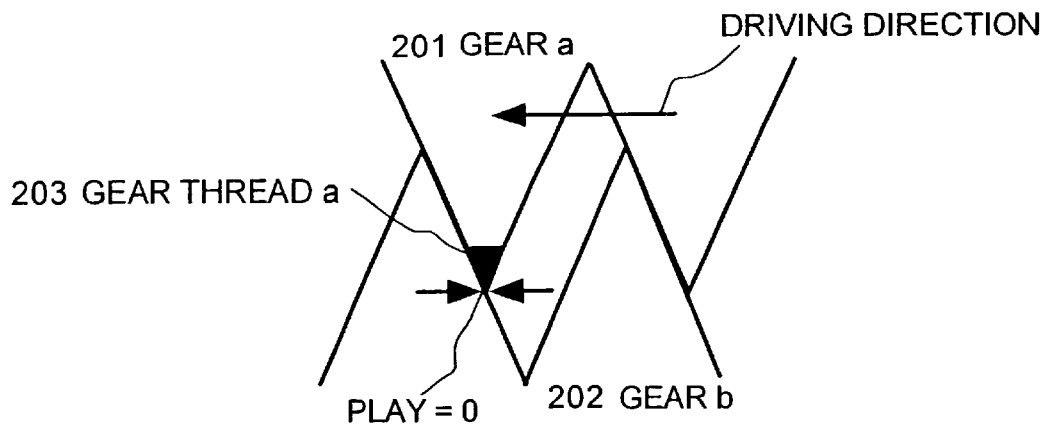
FIGS. 2(a) to 2(c) are diagrams showing profiles of the engagement of gears for driving a zoom lens.
Figure 2B:
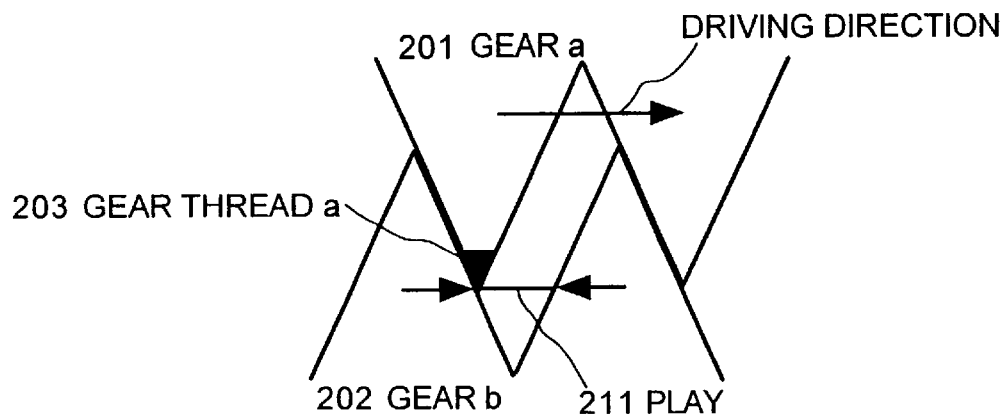
Figure 2C:
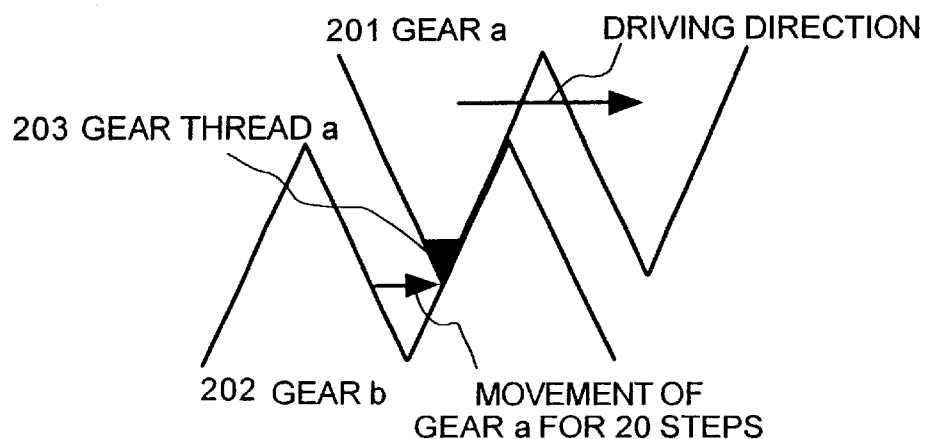

FIGS. 2(a) to 2(c) are diagrams showing a profile of the engagement condition of gear 105. Rotation of the stepping motor 106 is transmitted from the gear a 201 to the zoom lens 102 via the gear b 202. Here, during the forward rotation, no play is generated between the gear a 201 and gear b 202, as shown in FIG. 2(a). In this case, gear thread a 203 of gear a 201 is placed in contact in the forward direction with the gear b 202 to rotate the gear b 202.

However, when the driving direction is reversed, play 211 becomes a factor, immediately after the reversal of the rotating direction, between the gear a 201 and gear b 202, as shown in FIG. 2(b). In this case, since the gear thread a 203 of the gear a 201 is not placed in contact in the reverse direction with the gear b 202, the gear b 202 cannot be rotated immediately.

For example, if the amount of play 211 is assumed to be 20 steps, when the stepping motor 106 is driven for 20 steps after reversal of the rotating direction, the gear thread a 203 of the gear a 201 is moved in the reverse direction toward a thread of the gear b 202, as shown in FIG. 2(c). When the stepping motor 106 has been driven for 20 steps or more, the gear thread a 203 of the gear a 201 is placed in contact with the gear b 202. Thereafter, the gear b 202 is rotated to drive the zoom lens 101. Namely, when the rotating direction is reversed, if the stepping motor 106 is not driven by a distance exceeding the amount of play, the zoom lens 102 does not operate.

Therefore, if the physical position of zoom lens 102 (hereinafter referred to as physical lens position) is the same, an error equal to the amount of play may be generated in the optical zooming position (hereinafter referred to as calculated lens position) calculated by the optical zooming control circuit 107.

Next, a method of calculating the amount of play using the play calculating circuit 109 will be explained with reference to FIGS. 3(a) to 3(d).

Figure 3A:
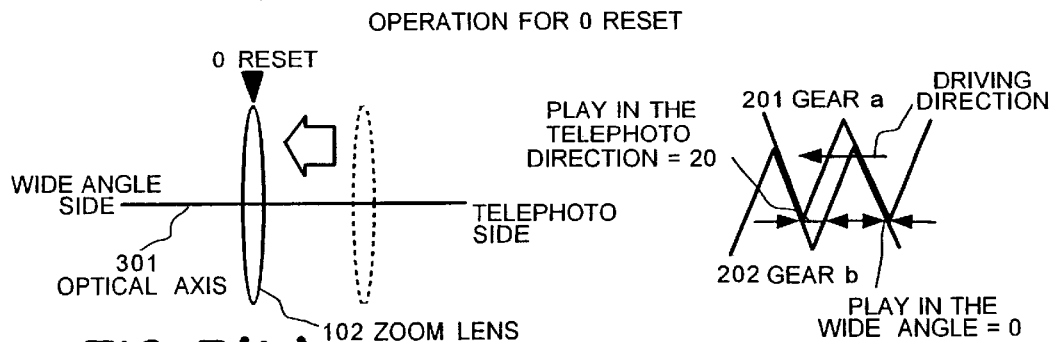
FIGS. 3(a) to 3(d) are diagrams showing movement of a zoom lens by the present invention when play is generated.

First, it is assumed, as shown in FIG. 3(a), that the initial physical lens position of the zoom lens 102 is located on the wide angle side as the zero reset position and zero reset is established by driving the zoom lens 102 in the zero reset direction when the power switch is turned on. In this case, since zero reset has been executed by driving the zoom lens 102 to the wide angle side, there is no play in the wide angle side between the gear a 201 and gear b 202 but a certain amount of play is generated on the telephoto side. Here, the amount of play is assumed to be 20 steps. The optical zooming control circuit 107 sets the calculated lens position during zero resetting to zero and equivalently controls the position of the zoom lens 102 by subtracting one (−1) for each drive of one step when the lens is moved to the wide angle side or by adding one (+1) for each drive of one step when the lens is moved to the telephoto side.

Figure 3B:
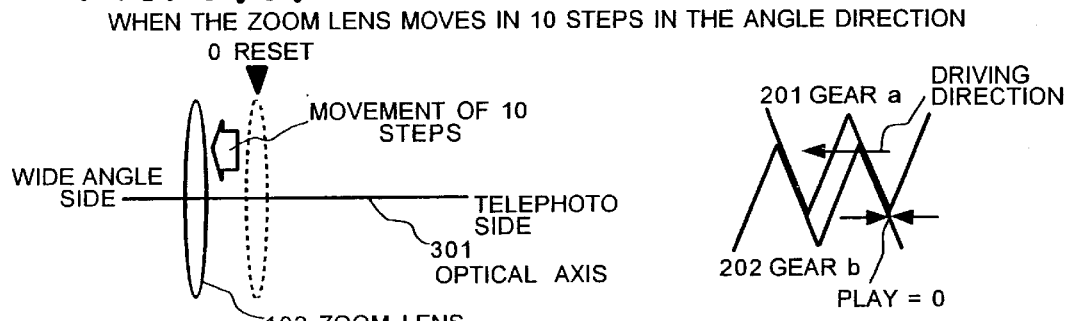
Figure 3C:
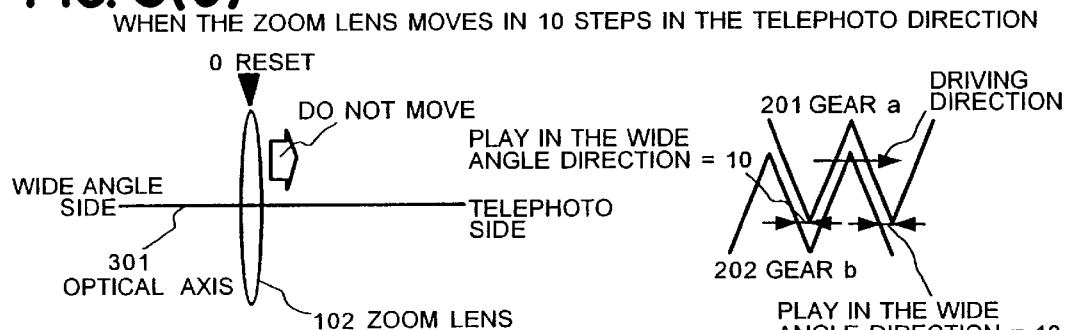
Figure 3D:
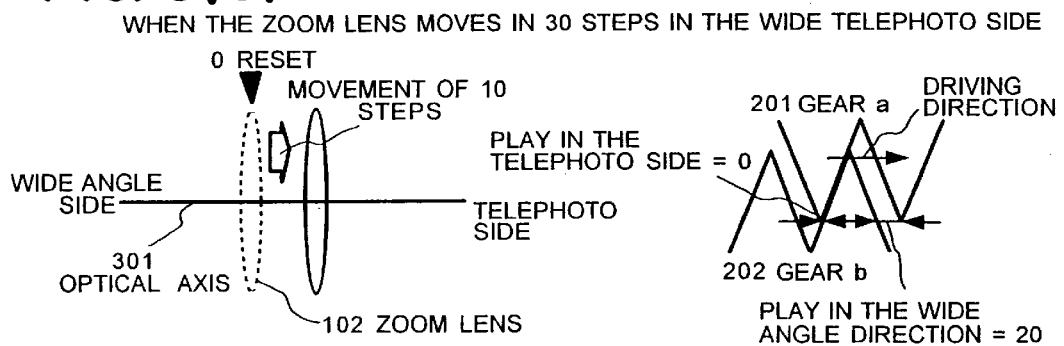

Next, as shown in FIG. 3(b), when the zoom lens is driven by 10 steps to the wide angle side from the zero reset position, both the physical lens position and the calculated lens position are indicated as −10 because there is no play in the wide angle direction. However, when the zoom lens is driven, on the contrary, by 10 steps to the telephoto side from the zero reset position as shown in FIG. 3(c), the physical lens position does not move because of existence of play. Namely, the physical lens position is 0, but the calculated lens position becomes 10, resulting in a mismatch between these lens positions. In this case, the amount of play becomes 10 steps in the telephoto side and also 10 steps in the wide angle side. Moreover, as shown in FIG. 3(d), when the lens is driven by 30 steps to the telephoto side from the zero reset position, the maximum amount of play of 20 steps can be canceled resulting in the physical lens position of 10 steps and calculated lens position of 30 steps. In this case, the play of 20 steps exists only in the wide angle direction.

As explained above, the amount of play on the telephoto side and wide angle side can always be calculated from the stored amount of play, the driving direction and the number of driving steps, and thereby an error between the calculated lens position and the physical lens position can be determined. In above example, the initial position of the zoom lens 102 when the power switch is turned on is assumed to be located on the telephoto side, but when the lens is located on the wide angle side, there is no play on the telephoto side at the zero reset position, but play is generated in the wide angle side.

Next, interlocking of the optical zooming operation and electronic zooming operation will be explained.

For a smooth zooming operation, it is desirable for the change of magnification of the zooming operation (hereinafter referred to as changing rate of magnification) to be constant. Magnification as used here is indicated by a decibel [dB] value and wide angle end is defined with respect to the reference point in 0 dB. Changing the rate of magnification means a change of magnification in a unit time. When this changing rate of magnification changes in a manner not assumed by a user of the imaging apparatus, the zooming rate unnaturally changes. Therefore, it is desirable for an interlocking operation of the optical zooming and electronic zooming to be provided such that the changing rate of magnification is kept constant.

FIGS. 4(a) to 4(c) show ideal examples of a transition to electronic zooming from optical zooming. The vertical axis defines the changing rate of magnification per field, while the horizontal axis defines the time (field). First, FIG. 4(a) shows an example where there is no mechanical play in the optical zooming means. The optical zooming control circuit 107 controls the zoom lens 102 to gradually reduce the moving speed and to finally stop. Meanwhile, when the optical zooming position signal 113 transmitted from the optical zooming control circuit 107 reaches the interlocking operation control starting position, the electronic zooming control circuit 108 actuates the electronic zooming and gradually raises the speed. The interlocking operation starting position is predetermined to make the changing rate of magnification constant. Thereby, the changing rate of magnification always becomes constant and the zooming rate never changes.

Next, FIG. 4(b) shows the condition wherein an error is generated between the calculated lens position and the physical lens position due to the mechanical play which is generated. If the physical lens position is assumed as −20 steps for the calculated lens position, the optical zooming stops at the position leading 20 steps against the calculated lens position. Meanwhile, when the electronic zooming is started from the interlocking operation starting position, which is predetermined under the condition that there is no play, the changing rate of magnification changes as shown in FIG. 4(b), resulting in an unnatural zooming operation.

In accordance with the present invention, the following compensation is carried out to eliminate such a disadvantage. The play calculating circuit 109 calculates mechanical plays on the wide angle side and telephoto side from a play signal a117 from the play memory 10A and an optical zooming control signal 112 from the optical zooming control circuit 107. The electronic zooming control circuit 108 calculates an error between the physical lens position and calculated lens position with a play signal b115 from the play calculating circuit 109 and changes the interlocking operation starting position, as shown in FIG. 4(c), depending on such error. Thereby, the changing rate of magnification can be kept constant during transition to electronic zooming from an optical zooming operation and a change of the zooming speed can also be prevented.

Figure 5A:
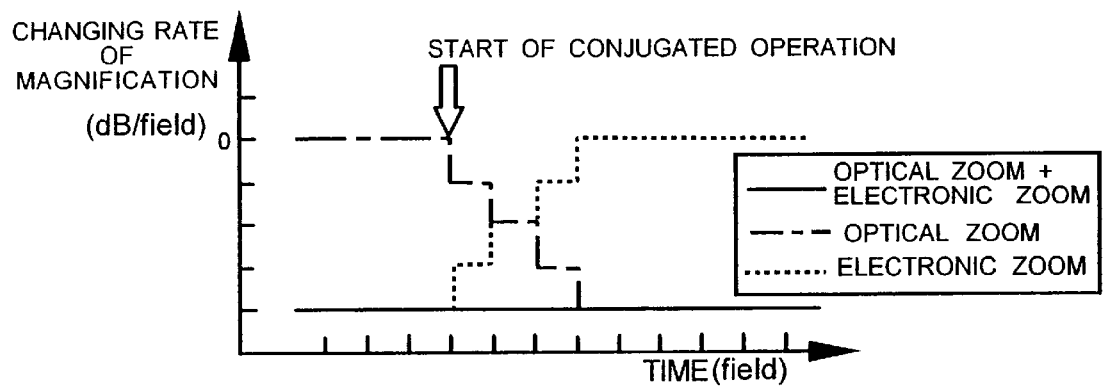
FIGS. 5(a) and 5(b) are diagrams showing a changing rate of magnification during transition to optical zooming from electronic zooming in accordance with the present invention.
Figure 5B:
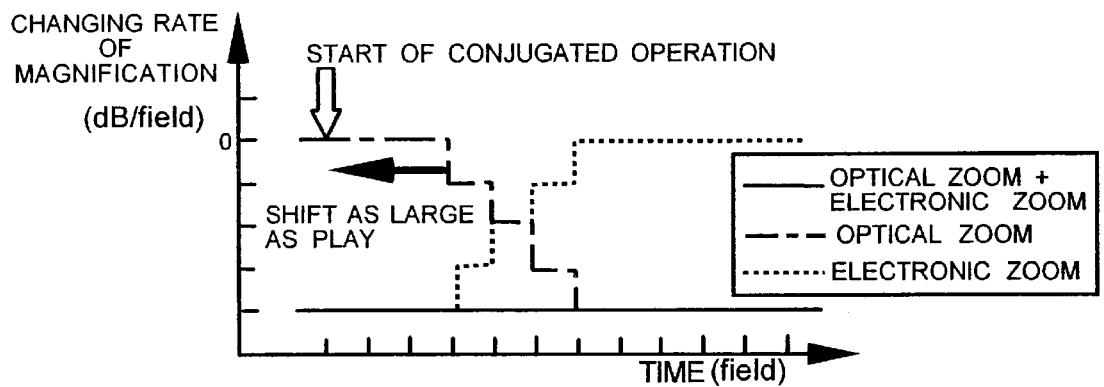

Next, a transition to optical zooming from electronic zooming will be explained with reference to FIGS. 5(a) and 5(b). FIG. 5(a) shows the condition where there is no mechanical play in the optical zooming means. The electronic zooming control circuit 108 stops the zooming operation by gradually reducing the zooming speed. Meanwhile, the optical zooming control circuit 107 starts the optical zooming operation and gradually raises the zooming speed when the electronic zooming position signal 114 transmitted from the electronic zooming control circuit 108 reaches the interlocking operation starting position. The interlocking operation starting position is previously determined to provide a constant changing rate of magnification. In this case, since magnification is gradually reduced, the changing rate of magnification is expressed as a negative value. Thereby, the changing rate of magnification becomes constant and the zooming rate is never changed.

Next, when a mechanical play is present, the following compensation is carried out. The play calculating circuit 109 calculates mechanical plays on the wide angle side and the telephoto side from a play signal a117 from the play memory 10A and an optical zooming control signal 112 from the optical zooming control circuit 107. The optical zooming control circuit 107 changes the interlocking operation starting position a shown in FIG. 5(b) depending on the amount of play on the wide angle side with the play signal b115 from the play calculating circuit 109. Thereby, the changing rate of magnification can be kept constant during transition to the optical zooming from electronic zooming and a change of zooming speed can also be prevented.

Next, a second method for preventing a change of the changing rate of magnification during transition to optical zooming from electronic zooming will be explained. In the method explained previously, a change of the changing rate of magnification has been prevented by changing the interlocking operation starting position, but in the second method, the interlocking operation starting position is never changed.

Figure 6:
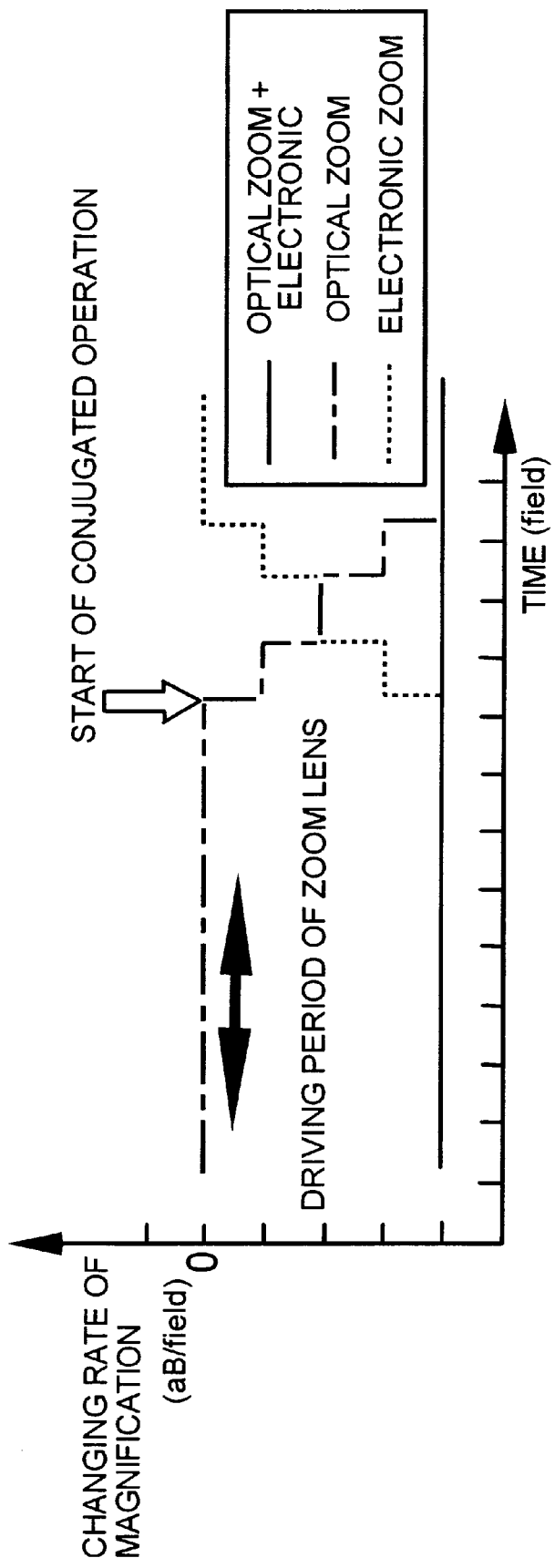
FIG. 6 is a diagram showing a changing rate of magnification during transition to optical zooming from electronic zooming in accordance with the present invention.

As shown in FIG. 6, the optical zooming control circuit 107 provides a period for compensating the zooming drive as much as the play on the wide angle side of the play signal b115 from the play calculating circuit 109 before the electronic zooming position signal 114 reaches the interlocking operation starting position from the electronic zooming control circuit 108 and previously sets the play on the wide angle side to zero. During this period, zooming drive is effected as much as the play and therefore the changing rate of magnification in the optical zooming is zero. Thereafter, the changing rate of magnification during transition to optical zooming from electronic zooming can be kept constant by once again starting the optical zooming from a predetermined interlocking operation starting position. The optical zooming control circuit 107 can freely set, only before the start of the interlocking operation, the position of the period for zooming drive as much as the play.

An ideal example for controlling the changing rate of magnification to zero has been explained above, and it is also to be understood additionally that as a result of the above compensation, no problem is generated due to the fact that a change of the changing rate of magnification can be controlled to such a degree that no visible change of the zooming speed will result.

Next, a change in the amount of play due to a temperature change will be explained. A structural element, such as a gear, expands or contracts depending on the ambient temperature. Particularly, when a material such as plastic is used, such expansion or contraction is distinctive. Namely, when the shape of the gear 105 changes depending on temperature, resultant mechanical play also changes. Therefore, in accordance with the present invention, the play calculating circuit 109 executes a temperature compensation for the play depending on the temperature characteristic of the play using the temperature signal 118 from the temperature detecting circuit 10B. Thereby, the amount of play can be calculated more accurately.

Moreover, in above example, the structural elements are all comprised within the imaging apparatus body, but it is also possible that a part of the structural elements, for example, the play memory 10A, may be provided as an external apparatus. That is, a memory, for example, of a personal computer or a portable information terminal or the like can be used as an external memory.

Finally, the amount of play to be stored in the play memory 10A will be explained. As already explained previously, the amount of play fluctuates depending on the manufacturing process. The same design does not always result in the same amount of play. If the visible zooming speed is in such a degree as zero, it is sufficient for a typical value of fluctuation to be previously stored in the play memory 10A. Such typical value may be set as the maximum value. Moreover, it may be stored after it is measured with a measuring apparatus for each imaging apparatus. In addition, it is also possible for it to be measured at the zero reset position for every turn-on operation of the power switch, at which times it is then stored in the play memory 10A.

We claim:

1. An imaging apparatus arranged to form an optical image on an imaging surface of a solid state imaging device via a predetermined optical system including a zoom lens and to produce an output image in the form of a video signal after said optical image is converted to an electrical signal, comprising:

an optical zooming device for moving said zoom lens of said optical system along its optical axis for magnifying or reducing said optical image of an object formed on said imaging surface;

an optical zooming controller for controlling said optical zooming device with an open loop control;

an electronic zooming device for magnifying and reducing said output image by changing the extracting size of the image on said imaging surface;

a memory for storing a value corresponding to an amount of mechanical play of said optical zooming device;

a play calculator for calculating an instantaneous amount of mechanical play of said optical zooming device on the basis of the value of the amount of mechanical play stored in said memory and a control result of said optical zooming controller; and an electronic zooming controller for controlling the output image of said electronic zooming device to continuously magnify and reduce the output image and for changing the interlocking operation starting position of electronic zooming so that the magnifying and reducing operations performed by said optical zooming device and by said electronic zooming device are smoothly interlocked, in case of an interlocking operation of said optical zooming device and said electronic zooming device, depending on the amount of mechanical play of said optical zooming device as calculated by said play calculator.

2. An imaging apparatus according to claim 1, further comprising a temperature detector for detecting a temperature of said optical zooming device and periphery thereof, wherein said play calculator compensates the calculated amount of mechanical play of said optical zooming device on the basis of the detection result of said temperature detector.

3. An imaging apparatus arranged to form an optical image on an imaging surface of a solid state imaging device via a predetermined optical system including a zoom lens and to produce an output image in the form of a video signal after said optical image is converted to an electrical signal, comprising:

an optical zooming device for moving said zoom lens of said optical system along its optical axis for magnifying or reducing said optical image of an object formed on said imaging surface;

an electronic zooming device for magnifying and reducing said output image by changing the extracting size of the image on said imaging surface;

an electronic zooming controller for controlling the output image of said electronic zooming device to continuously magnify and reduce said output image;

a memory for storing a value corresponding to an amount of mechanical play of said optical zooming device;

a play calculator for calculating an instantaneous amount of mechanical play of said optical zooming device on the basis of the value of mechanical play stored in said memory and a control result of an optical zooming controller; and an optical zooming controller for controlling said optical zooming device with an open loop control and for operating said optical zooming device only for a period in which the instantaneous amount of mechanical play of said optical zooming device calculated by said play calculator is reduced to zero before start of an interlocking operation of said electronic zooming device and said optical zooming device.

4. An imaging apparatus according to claim 3, further comprising a temperature detector for detecting a temperature of said optical zooming device and periphery thereof, wherein said play calculator compensates a calculated amount of mechanical play of said optical zooming device on the basis of the detection result of said temperature detector.

5. An imaging apparatus for detecting an optical image focused by an optical system including a zoom lens on the imaging surface of an imaging device, for converting the detected optical image into a predetermined video signal and then outputting the video signal, comprising:

a signal processor for outputting said video signal corresponding to a part or all of the optical image on said imaging surface by electrically processing an output signal of said imaging device;

an optical zooming mechanism for changing the magnification of said optical image by mechanically moving the zoom lens provided in said optical system;

a play detector for detecting an instantaneous value of mechanical play generated in said optical zooming mechanism; and a controller for controlling said signal processor to magnify and reduce an output image represented by said video signal outputted from said signal processor, for changing the image represented by said video signal by controlling said optical zooming device with open loop control and for changing, in a case of interlocking operation of said optical zooming mechanism and said signal processor, the operation period of said signal processor and said optical zooming mechanism depending on the instantaneous amount of play detected by said play detector so that a change of image produced by said optical zooming mechanism is smoothly reflected by a change of the image represented by said signal processor.

6. An imaging apparatus according to claim 5, further comprising a temperature detector for detecting a temperature of said optical zooming mechanism and periphery thereof, wherein said play detector compensates a detected amount of said play on the basis of the detection result of said temperature detector.

7. An imaging apparatus comprising:

an imaging device which converts an optical image into an electronic image signal;

an optical zooming device which has a zooming lens moving along an optical axis, and a driver which drives said zooming lens so as to magnify or reduce said optical image formed on a surface of said imaging device;

an electric zooming circuit which magnifies or reduces said image signal outputted from said imaging device by changing an extracting size;

a memory which stores a reference value representative of an amount of mechanical play of said optical zooming device, which mechanical play occurs by changing a direction of driving of said zooming lens;

a calculator which calculates a control value based on said reference value stored in said memory and a change in the driving direction of said zooming lens; and a control circuit which controls said optical zooming device and said electric zooming circuit based on said control value calculated by said calculator.

8. An imaging apparatus according to claim 7, further comprising:

a temperature detector which detects a temperature of said optical zooming device and periphery thereof;

wherein said calculator adjusts said control value based on the detection result of said temperature detector.

9. An imaging apparatus according to claim 7, wherein said control circuit controls said optical zooming device for a period in which said control valve calculated by said calculator is canceled before start of the interlocking operation of said electric zooming and said optical zooming.

10. An imaging apparatus according to claim 7, wherein said control circuit changes an interlocking starting point based on said control valve.

11. An imaging apparatus according to claim 7, wherein said control circuit delays a starting point of said electric zooming based on said control valve.

12. An imaging apparatus according to claim 7, wherein said optical zooming device includes gears and a stepping motor driving said zooming lens through said gears, and said mechanical play occurs at an engaging portion of said gears.

13. An imaging apparatus according to claim 7, wherein said control circuit controls said optical zooming device by an open loop control.

14. An imaging apparatus according to claim 7, wherein said control circuit controls said optical zooming device and said electric zooming circuit so as to maintain a changing rate of magnification during the interlocking operation.

15. An imaging apparatus comprising:

an imaging device which converts an optical image into an electric image signal;

an optical zooming device which has a zooming lens moving along an optical axis, and a driver which drives said zooming lens through gears;

a signal processing circuit which outputs at least a portion of said image signal outputted from said imaging device;

a memory which stores a reference value representative of an amount of mechanical play of said optical zooming device, which mechanical play occurs at an engaging portion of said gears by driving of said zooming lens;

a calculator which calculates a control value based on said reference value stored in said memory and a chance in the driving direction of said zooming lens; and a control circuit which controls said optical zooming device and said signal processing circuit to interlock an optical zooming of said optical zooming device and an electric zooming of said signal processing circuit based on said control value calculated by said calculator.

16. An imaging apparatus according to claim 15, further comprising:

a temperature detector which detects a temperature of said optical zooming device and the periphery thereof;

wherein said calculator adjusts said control valve based on the detection result of said temperature detector.

17. An imaging apparatus according to claim 15, wherein said control circuit changes an interlocking starting point based on said control valve.

18. An imaging apparatus according to claim 15, wherein said control circuit delays a starting point of said electric zooming based on said control valve.

19. An imaging apparatus according to claim 15, wherein said control circuit controls said optical zooming device by an open loop control.

20. An imaging apparatus according to claim 15, wherein said control circuit controls said optical zooming device and said signal processing circuit so as to maintain a changing rate of magnification during said interlocking.

* * * * *